United States Patent
Grass et al.

(10) Patent No.: US 9,600,875 B2
(45) Date of Patent: Mar. 21, 2017

(54) TISSUE SURFACE ROUGHNESS QUANTIFICATION BASED ON IMAGE DATA AND DETERMINATION OF A PRESENCE OF DISEASE BASED THEREON

(71) Applicant: KONINKLIJKE PHILIPS N.V., Eindhoven (NL)

(72) Inventors: Michael Grass, Buchholz in der Nordheide (DE); Thomas Koehler, Norderstedt (DE); Cristian Lorenz, Hamburg (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 14/441,045

(22) PCT Filed: Nov. 20, 2013

(86) PCT No.: PCT/IB2013/060271
§ 371 (c)(1),
(2) Date: May 6, 2015

(87) PCT Pub. No.: WO2014/083480
PCT Pub. Date: Jun. 5, 2014

(65) Prior Publication Data
US 2015/0287185 A1    Oct. 8, 2015

Related U.S. Application Data

(60) Provisional application No. 61/731,864, filed on Nov. 30, 2012.

(51) Int. Cl.
*G06K 9/00* (2006.01)
*G06T 7/00* (2006.01)

(52) U.S. Cl.
CPC .............. *G06T 7/0012* (2013.01); *G06K 9/00* (2013.01); *G06T 2207/10081* (2013.01);
(Continued)

(58) Field of Classification Search
CPC ......... G06T 2207/30056; G06T 7/0012; G06T 2207/10081; G06T 7/0083; G06T 7/602;
(Continued)

(56) References Cited

U.S. PATENT DOCUMENTS 5,784,162 A * 7/1998 Cabib .................. C12Q 1/6841
250/461.2
6,397,099 B1 * 5/2002 Chance .................. A61B 5/055
600/420
(Continued)

FOREIGN PATENT DOCUMENTS

WO    2007140814 A1    12/2007
WO    2010097472 A1    9/2010

OTHER PUBLICATIONS

Brancatelli, G., et al.; Cirrhosis: CT and MR imaging evaluation; 2007; European Journal of Radiology; 61:57-69.
(Continued)

*Primary Examiner* — Vu Le
*Assistant Examiner* — Aklilu Woldemariam

(57) ABSTRACT

Described herein is an approach to identify a presence (or absence) of a tissue disease based on a quantification of a roughness of a surface of the tissue represented in imaging data. The approach includes an image data processor (120) with a surface roughness quantifier (206) that generates a metric that quantifies a roughness of a surface of a tissue of interest in 3D image data based on a surface model adapted to the tissue of interest in the 3D image data and a decision
(Continued)

Figure 1:
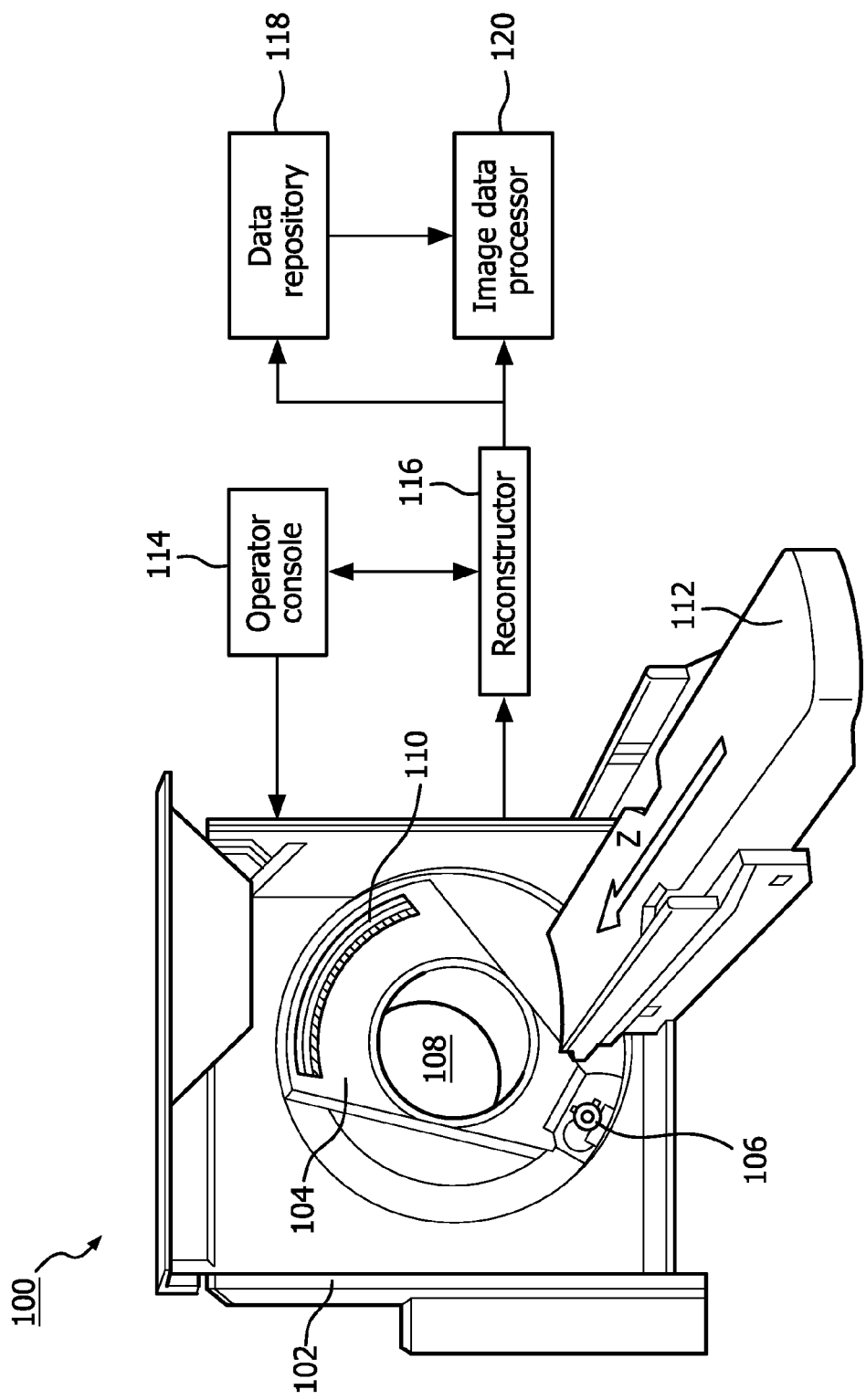

component (208) that generates a value signal indicating a presence or an absence of disease in the tissue of interest based on the metric.

16 Claims, 4 Drawing Sheets

(52) U.S. Cl.
CPC ............... *G06T 2207/10088* (2013.01); *G06T 2207/10116* (2013.01); *G06T 2207/30056* (2013.01)

(58) Field of Classification Search
CPC ......... G06T 2207/10072; G06T 7/0032; G06T 7/0081; G06T 2207/10116; G06T 17/20; G06T 2211/424; G06T 2211/432; G06T 2211/436; G06T 7/0004; G06T 2210/41; G06T 2207/10088; G06T 2207/30004; A61B 5/4244; A61B 8/08; A61B 8/13; A61B 5/7264; A61B 5/1077; A61B 2562/0242; A61B 5/1495; A61B 5/061; A61B 5/1455; A61B 5/1076; A61B 5/0066; A61B 5/0075; A61B 5/7257; A61B 1/00009; A61B 5/04; A61B 2090/364; A61B 5/0064; A61B 8/4245; A61B 90/36; A61B 2090/378; A61B 5/0073; A61B 2034/107; A61B 18/082; A61B 18/1442; A61B 1/0005; A61B 2562/0233; A61B 8/5238; A61B 5/444; A61B 90/361; A61B 5/411; A61B 5/4887; A61B 8/5261; A61B 2562/16; A61B 2576/00; A61B 6/502; A61B 8/406; A61B 2560/0276; A61B 5/72; Y10S 128/922; G01N 2223/612; G01N 23/046; G01N 2021/6423; G01N 33/5041; A61L 2300/412; G01B 9/02048; G01B 9/02091; G05B 19/4099; G01J 3/12; G01J 3/453; C12Q 1/6883; G06K 9/6202; G06K 9/76; B82Y 5/00; G02B 21/0024; G02B 7/003
USPC ........ 382/128, 129, 130, 131, 132; 600/407, 600/431, 109, 411, 420, 414, 437, 453
See application file for complete search history.

(56) References Cited

U.S. PATENT DOCUMENTS

| | | | | |
|---|---|---|---|---|
| 6,898,303 B2* | 5/2005 | Armato, III | .......... | G06T 7/0012 378/21 |
| 7,815,574 B2* | 10/2010 | Mourad | ............... | A61B 5/0048 600/407 |
| 8,386,014 B2* | 2/2013 | Ciaccio | ................ | A61B 5/1075 382/128 |
| 8,603,084 B2* | 12/2013 | Fish | ................... | A61B 18/1492 606/34 |
| 8,699,751 B2* | 4/2014 | Maladen | ............... | G06T 7/0004 382/103 |
| 2002/0172406 A1* | 11/2002 | Rouet | ..................... | G06T 17/20 382/128 |
| 2004/0206882 A1* | 10/2004 | Banks | .................. | A61B 5/0059 250/201.2 |
| 2005/0054910 A1* | 3/2005 | Tremblay | ............... | A61B 5/055 600/411 |
| 2006/0058611 A1* | 3/2006 | Descour | ................... | B82Y 5/00 600/407 |
| 2006/0120580 A1* | 6/2006 | Makram-Ebeid | ..... | G06T 7/0012 382/128 |
| 2008/0058593 A1* | 3/2008 | Gu | ........................ | G06T 7/0012 600/109 |
| 2008/0247622 A1* | 10/2008 | Aylward | ............... | A61B 90/36 382/131 |
| 2010/0220913 A1* | 9/2010 | Slabaugh | .............. | G06T 7/0012 382/131 |
| 2010/0284592 A1* | 11/2010 | Arnon | ..................... | A61B 5/015 382/128 |
| 2011/0172533 A1 | 7/2011 | Yao et al. | | |
| 2011/0243409 A1* | 10/2011 | Naimi | .................. | A61B 5/0064 382/128 |
| 2011/0282181 A1* | 11/2011 | Wang | .................... | A61B 5/0095 600/407 |
| 2012/0177260 A1 | 7/2012 | Su et al. | | |
| 2012/0224758 A1* | 9/2012 | Treece | .................. | G06T 7/0012 382/131 |
| 2014/0350395 A1* | 11/2014 | Shachaf | ................ | G06T 7/0012 600/431 |
| 2015/0119708 A1* | 4/2015 | Sachse | ................. | A61B 5/0071 600/431 |
| 2016/0070436 A1* | 3/2016 | Thomas | ................. | A61B 19/50 715/771 |

OTHER PUBLICATIONS

Chen, E-L, et al.; An Automatic Diagnostic System for CT Liver Image Classification; 1998; IEEE Trans. on Biomedical Engineering; 45(6)783-794.

Chen, C-C., et al.; Fractal feature analysis and classification in medical imaging; 1989; IEEE Trans. on Medical Imaging; 8(2)133-142.

Sun, Y. N., et al.; Ultrasonic image analysis for liver diagnosis; 1996 (current version 2002); IEEE Engineering in Medicine and Biology Magazine; 15(6)93-101.

* cited by examiner

TISSUE SURFACE ROUGHNESS QUANTIFICATION BASED ON IMAGE DATA AND DETERMINATION OF A PRESENCE OF DISEASE BASED THEREON

CROSS REFERENCE TO RELATED APPLICATIONS

This application is a national filing of PCT application Serial No. PCT/IB2013/060271, filed Nov. 20, 2013, published as WO 2014/083480 A1 on Jun. 5, 2014, which claims the benefit of U.S. provisional application Ser. No. 61/731,864 filed Nov. 30, 2012, which is incorporated herein by reference.

The following generally relates to quantifying a roughness of a surface of tissue in image data and determining a presence (or absence) of a disease of the tissue based thereon, and is described with particular application to computed tomography (CT). However, the following is also amenable to imaging modalities such as X-ray, magnetic resonance imaging (MRI), volumetric C-arm scanner and/or other imaging modality.

A typical computed tomography (CT) scanner has included an x-ray tube mounted on a rotatable gantry opposite a detector. The x-ray tube rotates around an examination region and emits polychromatic radiation that traverses the examination region and a subject and/or object disposed therein. The detector array detects radiation that traverses the examination region and produces a signal indicative thereof. A reconstructor reconstructs the signal and generates volumetric image data indicative of the subject and/or object disposed in the examination region. One or more images can be generated from the volumetric image data.

Disease of certain tissue/organs of the human body results in replacement of normal healthy tissue with fibrous tissue, which leads to a change in the surface shape of the tissue. For example, liver cirrhosis is a consequence of chronic liver disease, most commonly caused by alcoholism, hepatitis B and C and fatty liver disease. Liver cirrhosis is characterized by a replacement of normal healthy liver tissue by fibrosis, scar tissue and nodules of regenerated liver tissue. This remodeling leads to a change in the surface shape of the liver, and the surface of the liver, which is smooth for normal healthy tissue, starts to develop corrugations.

Image data (CT, MRI, etc.) based analysis has provided useful qualitative information. For example, the above noted remodeling can be visualized in image data generated by medical imaging modalities such as computed tomography (CT), magnetic resonance imaging (MRI), and/or other imaging modality. That is, the change in the surface shape of the liver and the corrugations can be visualized between an image with normal healthy liver tissue and diseased liver tissue through visual inspection and visual comparison of the images.

Unfortunately, such visual inspection consumes clinician time, which could otherwise be spent with patients, and relies on subjective determination of the clinician, and/or results of other tests (e.g., biopsy, etc.) prescribed based on the visual inspection, to determine a presence or absence of the disease. In view of the above, there exists an unresolved need for other approaches to detecting surface changes and a presence or absence of a disease of the tissue of interest based thereon.

Aspects described herein address the above-referenced problems and others.

Described herein is an approach to identify a presence (or absence) of tissue disease based on a quantification of a roughness of a surface of the tissue represented in imaging data.

In one aspect, an image data processor includes a surface roughness quantifier that generates a metric that quantifies a roughness of a surface of a tissue of interest in 3D image data based on a surface model adapted to the tissue of interest in the 3D image data and a decision component that generates a value signal indicating a presence or an absence of disease in the tissue of interest based on the metric.

In another aspect, a method includes generating a metric that quantifies a roughness of a surface of a tissue of interest in 3D image data based on a surface model adapted to the tissue of interest in the 3D image data, and generating a value signal indicating a presence or an absence of disease in the tissue of interest based on the metric.

In another aspect, a method includes generating a value that quantifies a roughness of a surface of the liver represented in 3D image data based on a surface model adapted to the liver in the 3D image data, wherein the value directly determines a presence or absence of disease of the liver.

The invention may take form in various components and arrangements of components, and in various steps and arrangements of steps. The drawings are only for purposes of illustrating the preferred embodiments and are not to be construed as limiting the invention.

FIG. 1 schematically illustrates an image data processor in connection with an imaging system and a data repository.

Figure 2:
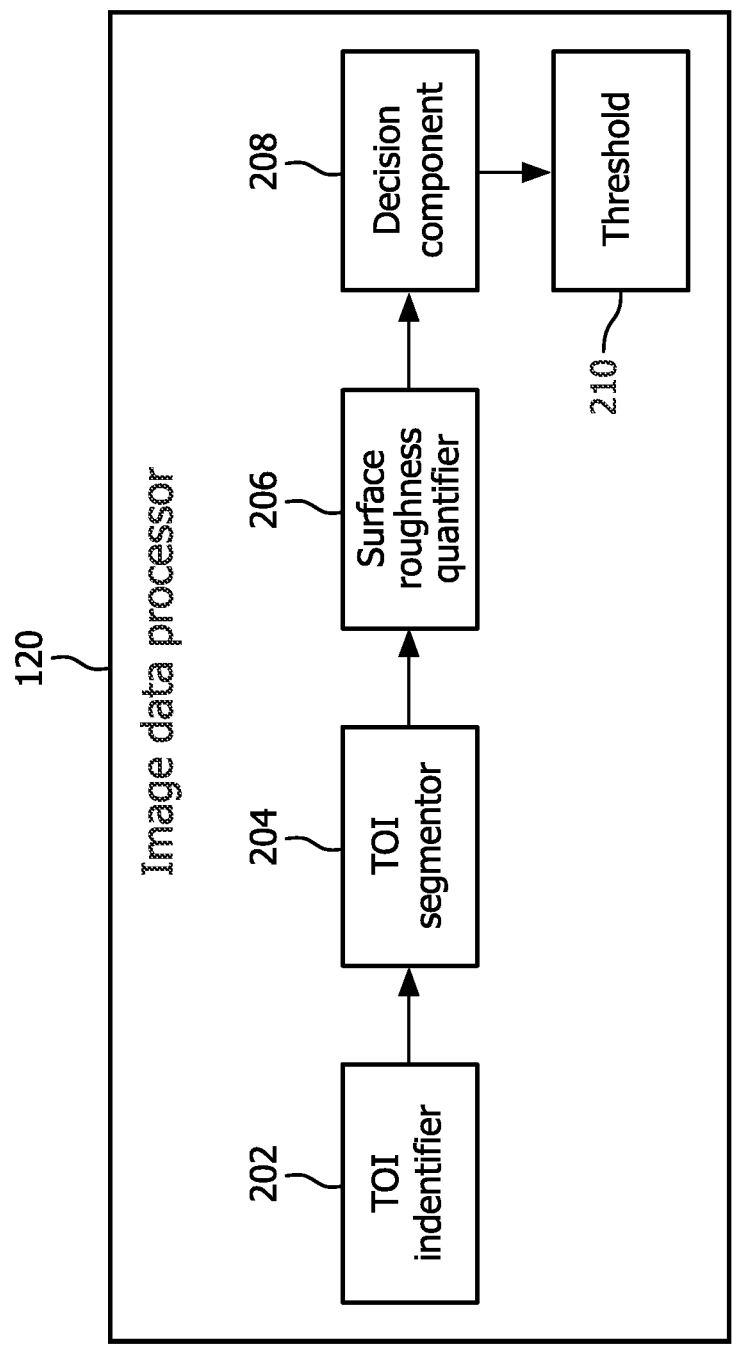

FIG. 2 schematically illustrates an example of the image data processor of FIG. 1.

Figure 3:
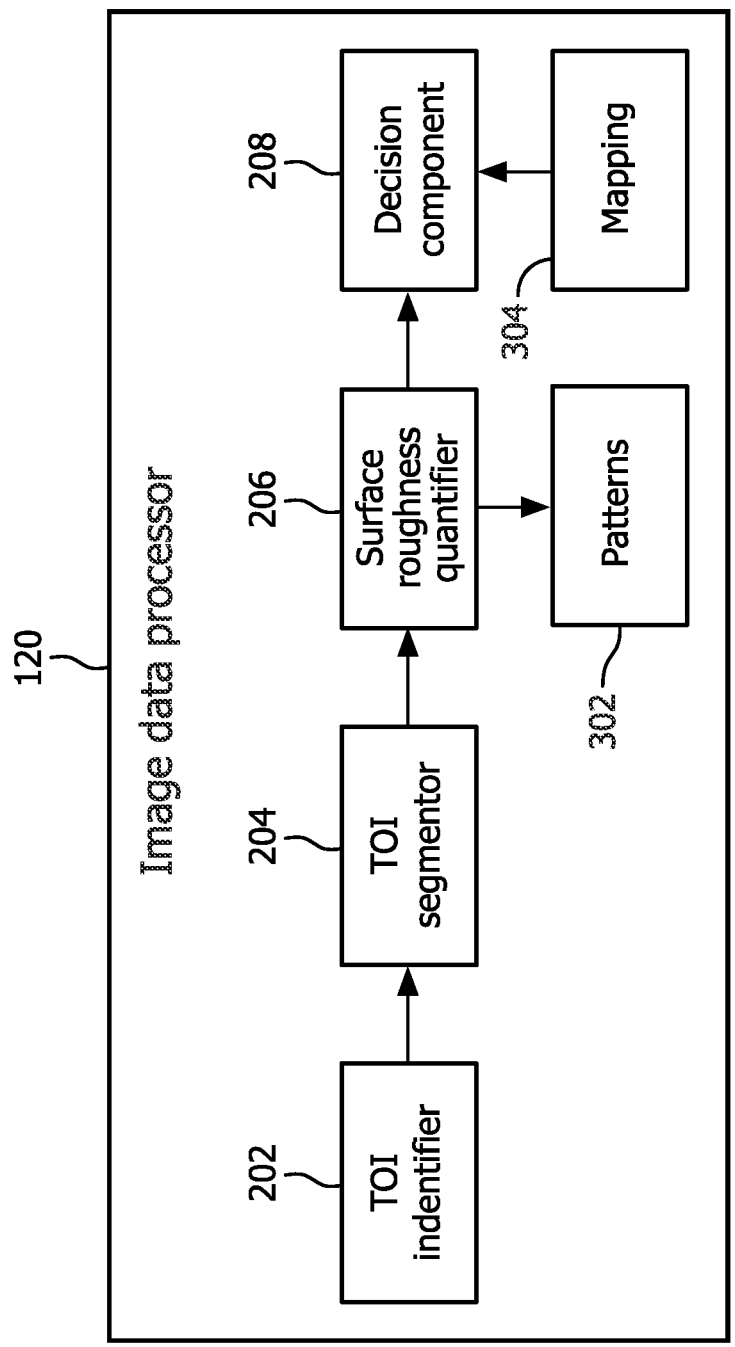

FIG. 3 schematically illustrates another example of the image data processor of FIG. 1.

Figure 4:
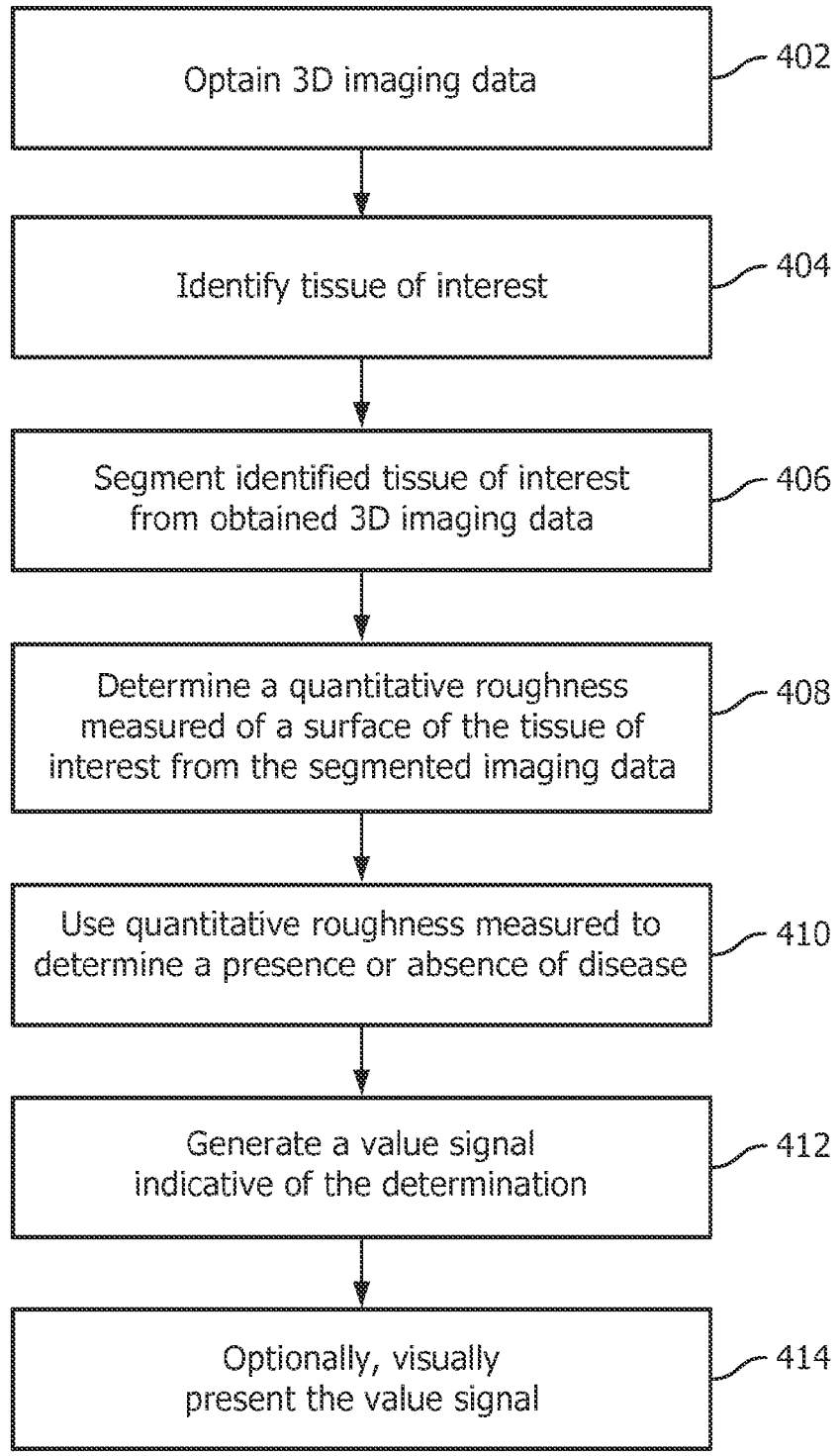

FIG. 4 schematically illustrates an example of method in accordance with the image data processor of FIG. 1.

The following describes an approach to quantify tissue disease based on a roughness of a surface of the tissue represented in image data and identify a presence (or absence) of the disease in the tissue based thereon.

With reference to FIG. 1, an imaging system 100 includes a computed tomography (CT) scanner, which includes a generally stationary gantry portion 102 and a rotating gantry portion 104. (As discussed herein, a MRI, X-ray, or other imaging modality could alternatively be employed.) The rotating gantry portion 104 is rotatably supported by the generally stationary gantry portion 102 via a bearing (not visible) or the like.

A radiation source 106, such as an x-ray tube, is supported by the rotating gantry portion 104 and rotates therewith around an examination region 108 about a longitudinal or z-axis. A detector array 110 subtends an angular arc opposite the examination region 108 relative to the radiation source 106. The detector array 110 detects radiation that traverses the examination region 108 and generates a signal indicative thereof.

A subject support 112 supports a subject or object in the examination region 108. An operator console 114 facilitates user interaction with the scanner 100. A reconstructor 116 reconstructs the signal, generating volumetric (3D) image data indicative of the scanned subject or object. The signal and/or reconstructed image data can be stored in a data repository 118, such as picture archiving and communication system (PACS), a radiology information system (RIS), a hospital information system (HIS), etc.

An image data processor 120 processes image data from the imaging system 100, the data repository 118, and/or other device. Such processing includes quantifying a roughness of a tissue of interest in the image data and determining, based on the quantified roughness, a presence or absence of disease. Such processing can be used to identify a presence or absence of cirrhosis in liver tissue and/or other disease in other tissue. This can be achieved without using a statistical model that employs a random variable to determine a likelihood of disease.

As described in greater detail below, in one non-limiting instance, such processing includes localizing the tissue of interest in 3D image data (e.g., via segmentation with a model or otherwise), performing coarse and/or refine delineation of a surface of the localized tissue of interest, and analyzing the delineated surface based on surface corrugations (e.g., amplitude, frequency, wavelength, distribution, etc.) using predetermined thresholds, predetermined patterns, etc. A non-limiting example of a suitable pattern includes surface patches, such as gray value pattern variations that may vary across a surface of an organ, in the image data of patients with a classified disease state. Where a catalog of such patterns is available, the pattern from the catalog that is closest to the delineated surface is selected and utilized to identify the disease state.

The image data processor 120 can be implemented via one or more micro-processors of one or more computers that execute one or more computer readable instructions. In one instance, the one or more computer readable instructions are encoded on computer readable storage medium such a physical memory and/or other non-transitory medium. Additionally or alternatively, at least one of the computer readable instructions can be carried by a carrier waver, a signal and/or other transitory medium.

FIG. 2 schematically illustrates an example of the image data processor 120. As discussed above, the data processor 120, receives as input, 3D imaging data.

A tissue of interest (TOI) identifier 202 identifies a tissue of interest in the imaging data. Identification can be based on the scan protocol (e.g., liver scan), a user input, and/or other information.

A tissue of interest (TOI) segmentor 204 segments the tissue of interest from the imaging data. Known and/or other segmentation, including fully automatic and/or semi-automatic requiring user interaction, approaches are contemplated herein. By way of non-limiting example, in one instance, a model based organ segmentation is employed. Organ based models have been available as pre-defined triangulated surface models, which have been trained on medical image data sets from different modalities. Coarse and/or refined models are contemplated herein.

With such a model, a surface model can be initially positioned in the 3D imaging data. Then, the surface model is (automatically and/or semi-automatically) adapted to the surface of the tissue organ of interest based on an external energy term based on image features and an internal energy term which carries the predefined shape of the organ and its possible deformations to fit a large patient population. Other approaches are also contemplated herein. For example, a fully manual approach can be employed in which the user manually segments the tissue of interest.

A surface roughness quantifier 206 quantifies a surface roughness of the tissue of interest based on how the surface model is adapted to the surface of the organ. In one instance, the roughness is determined by starting from a position of each triangle on the surface model and calculating a position variation of a typical contrast gradient with respect to a mean surface position along a direction normal to the model surface. The mean surface position can be determined by the initial surface model adaptation.

In this example, a mathematical integral of the position variance of this gradient normalized to a total tissue of interest surface provides a quantitative measure for the surface roughness. Local roughness measures can also be determined. For example, the number of surface triangles of the base model can be increased until the variation of the surface is well captured by a refined model. Then, the refined model can be compared with the initial model to provide a more local measure of roughness.

A decision component 208 compares the roughness values to a predetermined threshold 210. Where a roughness value exceeds the threshold, the decision component 208 generates a first value signal indicative thereof (thereby directly determining the presence of the disease), and where a roughness value does not exceed the threshold, the decision component 208 generates a second value signal indicative thereof. The values may also provide information about a stage of the disease, where the disease is present, i.e., by comparing against different thresholds, the decision component can generate an output related to the disease stage. The first and/or second value signal can be displayed in connection with the image data and/or otherwise to provide a visual metric that indicates whether the disease is present.

Additionally or alternatively, the surface roughness quantifier 206 determines a spatial position variation of at least one of an amplitude, a wavelength, or a frequency and/or a distribution of the amplitude on the surface as a function of at least one of wavelength or frequency, and the decision component 208 compares the spatial position variation and/or the distribution to a corresponding predetermined threshold to make the determination. For instance, the surface roughness quantifier 206 can perform a frequency analysis of the spatial position variation relative to a position of a mean position (smooth mesh) of the adapted surface model. Again, the decision component 208 generates the first value signal where the variation satisfies the threshold and generates the second value signal where the variation does not satisfy the threshold.

In FIG. 3, the surface roughness quantifier 206 compares the adapted surface model to predetermined patterns 302, such as gray value pattern variations, and identifies a pattern with the strongest correlation to the adapted surface model. For example, with respect to particular tissue such as the liver, the adapted surface model can be compared with gray value pattern variations, stored in a database or the like, which may occur at the surface of the liver when liver cirrhosis is in different stages and may vary across the surface. These patterns are adapted locally to the surface, and the pattern with the strongest correlation to the surface model is identified. The decision component 208 compares the identified pattern to a pattern-to-stage map 304. The decision component 208 generates a value signal indicative of the mapping. The mapping indicates, at least, whether the disease is present in the tissue of interest, and can provide information about a stage of the disease, where the disease is present.

The value signal can be displayed in connection with the image data and/or otherwise to provide a visual metric that indicates whether the disease is present in the tissue of interest. By way of example, in one instance the value signal is presented in a visualization of the roughness on the surface, for example, as a 3D color-coded surface rendering.

In another embodiment, the image data processor 120 includes a combination of FIGS. 2 and 3 and/or other approaches to determining the roughness of the surface.

FIG. 4 illustrate methods for determining a presence or absence of disease in a tissue of interest.

It is to be appreciated that the ordering of the acts is not limiting. As such, other orderings are contemplated herein. In addition, one or more acts may be omitted and/or one or more additional acts may be included.

At 402, 3D image data is obtained. Such image data can be obtained from the imaging system 100, another imaging system, the date repository 118, other date repository, and/or other device.

At 404, a tissue of interest is identified. Generally, the tissue of interest in this example is organ tissue that develops a surface roughness when diseased, relative to the a surface of the organ when disease is absent. A non-limiting example is liver tissue, in which liver cirrhosis is characterized by a replacement of normal healthy liver tissue by fibrosis, scar tissue and nodules of regenerated liver tissue.

At 406, the identified tissue of interest is segmented from the obtained 3D imaging data. As discussed herein, known and/or other segmentation techniques can be applied to segment the tissue of interest.

At 408, a quantitative roughness measure of a surface of the tissue of interest is determined from the segmented imaging data. As discussed herein, the quantitative roughness measure can be based on amplitude, frequency, wavelength, patterns, etc. of corrugations on the surface of the tissue of interest.

At 410, the quantitative roughness measure is used to determine a presence or absence of a disease. As discussed herein, this can be achieved by comparing the quantitative roughness measure to predetermined thresholds, patterns, and/or other information derived from previous studies of subject with and without the disease.

At 412, a value signal, indicative of whether the disease is presence or absence, is generated. As discussed herein, the value signal may also indicate a stage of a disease where it is determined that a disease is present.

At 414, optionally, the value signal is visually presented. As discussed herein, this includes visually displaying the value signal along with the image data and/or the segmented image data.

The above methods may be implemented by way of computer readable instructions, encoded or embedded on computer readable storage medium, which, when executed by a computer processor(s), cause the processor(s) to carry out the described acts. Additionally or alternatively, at least one of the computer readable instructions is carried by a signal, carrier wave or other transitory medium.

The invention has been described with reference to the preferred embodiments. Modifications and alterations may occur to others upon reading and understanding the preceding detailed description. It is intended that the invention be constructed as including all such modifications and alterations insofar as they come within the scope of the appended claims or the equivalents thereof.

The invention claimed is:

1. An image data processor, comprising:
   a surface roughness quantifier that is configured to generate a roughness metric that quantifies a roughness of a surface of a tissue of interest in 3D image data based on a surface model adapted to the tissue of interest in the 3D image data, wherein generating the roughness metric comprises:
      calculating a position variation of a pre-defined contrast gradient with respect to a mean surface position along a direction normal to the model surface; and
      determining an integral of a local position variance of the gradient, normalized to a total tissue of interest surface; and
   a decision component that is configured to generate a value signal indicating a presence or an absence of disease in the tissue of interest based on the roughness metric, wherein generating the value signal comprises:
      comparing the roughness metric to a predetermined threshold;
      generating a first value of the value signal if the roughness metric exceeds the predetermined threshold; and
      generating a second value of the value signal if the roughness metric does not exceed the predetermined threshold.

2. The image data processor of claim 1, wherein at least one of the first value and the second value indicates a stage of the disease.

3. The image data processor of claim 1, wherein the mean surface position is determined by an initial surface model adaptation.

4. The image data processor of claim 1, wherein the position variation pattern indicates a stage of the disease.

5. The image data processor of claim 1, wherein the surface roughness quantifier is further configured to determine one or more of a spatial position variation of at least one of an amplitude, a wavelength, a frequency or a distribution of the amplitude on the surface as a function of at least one of wavelength or frequency, and the decision component is further configured to compare the spatial position variation to a corresponding predetermined threshold to make the determination.

6. The image data processor of claim 1, wherein surface roughness quantifier is further configured to compare the adapted surface model to predetermined patterns and identify a pattern with the strongest correlation to the adapted surface model, and the decision component is further configured to compare the identified pattern to a pattern-to-stage map and generate a value signal indicative of the mapping, wherein the mapping indicates whether the disease is present or absent.

7. The image data processor of claim 6, wherein the identified pattern indicates a stage of the disease.

8. The image data processor of claim 1, wherein the model includes a pre-defined triangulated surface, and the surface roughness quantifier is further configured to adapt the model to the surface of the tissue of interest based on an external energy term and an internal energy term.

9. The image data processor of claim 8, wherein the external energy term is based on images features and the internal energy term includes a predefined shape of the tissue of interest.

10. The image data processor of claim 1, wherein the pre-defined triangulated surface is trained on medical image data sets from different modalities.

11. A method, comprising:
    generating a roughness metric that quantifies a roughness of a surface of a tissue of interest in 3D image data based on a surface model adapted to the tissue of interest in the 3D image data; and
    generating a value signal indicating a presence or an absence of disease in the tissue of interest based on the roughness metric,
    wherein the model includes a pre-defined triangulated surface which is adapted to the surface of the tissue of interest, and generating the roughness metric comprises:
       calculating a position variation of a pre-defined contrast gradient with respect to a mean surface position along a direction normal to the model surface; and determining an integral of a local position variance of the gradient, normalized to a total tissue of interest surface, thereby generating the roughness metric; and wherein generating the value signal comprises:

comparing the roughness metric to a predetermined threshold;

generating a first value of the value signal if the roughness metric exceeds the predetermined threshold; and generating a second value of the value signal if the roughness metric does not exceed the predetermined threshold.

12. The method of claim 11, wherein generating the roughness metric and the value signal do not include using a statistical model in which the roughness is a random variable.

13. The method of claim 11, further comprising:

increasing a number of surface triangles of the model, creating a refined model; and comparing the refined model to the model to determine a more localized metric.

14. The method of claim 11, further comprising:

determining a spatial position variation of at least one of a wavelength, a frequency of a distribution of the roughness; and comparing the spatial position variation to a corresponding predetermined threshold to determine the presence or absence of the disease.

15. The method of claim 11, further comprising:

comparing the adapted surface model to predetermined patterns;

identifying a pattern of the predetermined patterns with a strongest correlation to the adapted surface model;

comparing the identified pattern to a pattern-to-stage map; and identifying a map corresponding to the identified pattern, wherein the map indicates the presence or absence of the disease.

16. The method of claim 15, wherein the map indicates a stage of the disease.

* * * * *